(12) United States Patent
Watarai

(10) Patent No.: US 8,781,663 B2
(45) Date of Patent: Jul. 15, 2014

(54) BICYCLE DRIVE APPARATUS

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/590,620

(22) Filed: Aug. 21, 2012

(65) Prior Publication Data

US 2013/0054066 A1 Feb. 28, 2013

(30) Foreign Application Priority Data

Aug. 29, 2011 (JP) .................................. 2011-186595

(51) Int. Cl.
  *G06F 17/00* (2006.01)
  *F16H 61/02* (2006.01)
  *B62M 6/70* (2010.01)

(52) U.S. Cl.
  CPC . *F16H 61/02* (2013.01); *B62M 6/70* (2013.01)
  USPC .......................................................... 701/22

(58) Field of Classification Search
  CPC ................................. F16H 61/02; B62M 6/70
  USPC .......................................................... 701/22
  See application file for complete search history.

(56) References Cited

U.S. PATENT DOCUMENTS

| | | | | |
|---|---|---|---|---|
| 5,599,244 A | * | 2/1997 | Ethington | 474/70 |
| 5,992,553 A | * | 11/1999 | Morrison | 180/206.2 |
| 6,047,230 A | * | 4/2000 | Spencer et al. | 701/57 |
| 6,926,637 B2 | * | 8/2005 | Uno | 477/3 |
| 6,957,129 B2 | * | 10/2005 | Hatanaka et al. | 701/1 |
| 7,383,103 B2 | * | 6/2008 | Guderzo et al. | 701/1 |
| 7,406,367 B2 | * | 7/2008 | Uno | 701/1 |
| 7,623,931 B2 | * | 11/2009 | Campagnolo et al. | 700/17 |
| 7,630,810 B2 | * | 12/2009 | Guderzo | 701/51 |
| 7,706,935 B2 | * | 4/2010 | Dube et al. | 701/22 |
| 8,249,782 B2 | * | 8/2012 | Miglioranza | 701/51 |
| 2005/0075774 A1 | * | 4/2005 | Takamoto et al. | 701/51 |

FOREIGN PATENT DOCUMENTS

JP          2001-10581 A          1/2001

* cited by examiner

*Primary Examiner* — Thomas Tarcza
*Assistant Examiner* — Alex C Dunn
(74) *Attorney, Agent, or Firm* — Global IP Counselors

(57) ABSTRACT

A bicycle drive apparatus comprises a bicycle crankset, a bicycle transmission, a drive assistance electric motor, a crank variation determining sensor and a microcomputer. The crank variation determining sensor is arranged to determine a variation value related to rotation of the bicycle crankset. The microcomputer includes a shift command section, a limiting section, a determining section and a limitation cancelling section. The shift command section issues a shift command commanding the bicycle transmission to change gears. The limiting section limits an output of the drive assistance electric motor upon issuance of the shift command. The determining section determines completion of a gear shift operation upon the variation value being within a prescribed range. The limitation cancelling section cancels the limitation of the output of the drive assistance motor upon the determining section determining the completion of the gear shift operation.

9 Claims, 11 Drawing Sheets

BICYCLE DRIVE APPARATUS

CROSS-REFERENCE TO RELATED APPLICATIONS

This application claims priority under 35 U.S.C. §119 to Japanese Patent Application No. 2011-186595, filed Aug. 29, 2011. The entire disclosure of Japanese Patent Application No. 2011-186595 is hereby incorporated herein by reference.

BACKGROUND

1. Field of the Invention

The present invention relates to a bicycle control apparatus that controls an electrically assisted bicycle. More specifically, the present invention relates to a bicycle control apparatus that controls a bicycle having an electric motor for riding assistance and a transmission.

2. Background Information

Recently, electrically assisted bicycles that assist riding by supplementing a person's pedaling force with a motor drive force are becoming popular. Japanese Laid-Open Patent Publication No. 2001-10581 discloses a control enabling the transmission to smoothly conduct a gear shifting operation in an electrically assisted bicycle equipped with a transmission. When a user performs an operation issuing a shift command, the control temporarily stops or decreases an assisting power supplied from a drive assistance motor and resumes the supply of the assisting power to assist the rider after confirming that the gear shifting operation has been completed based on a sensor that detects a shift position.

SUMMARY

The control disclosed in Japanese Laid-Open Patent Publication No. 2001-10581 incurs the problem of the bicycle structure becoming more complex because it requires a sensor to detect the shift position in order to determine if the gear shifting operation has been completed. Depending on the type of transmission, it is sometimes difficult to provide such a sensor.

The object of the present invention is to enable completion a gear shifting operation to be confirmed with a simple structure in a bicycle configured to provide riding assistance using an electric motor.

In accordance with a first aspect, a bicycle drive apparatus is provided that basically comprises a bicycle crankset, a bicycle transmission, a drive assistance electric motor, a crank variation determining sensor and a microcomputer. The crank variation determining sensor s arranged to determine a variation value related to rotation of the bicycle crankset. The microcomputer includes a shift command section, a limiting section, a determining section and a limitation cancelling section, The shift command section issues a shift command commanding the bicycle transmission to change gears. The limiting section limits an output of the drive assistance electric motor upon issuance of the shift command. The determining section determines completion of a gear shift operation upon the variation value being within a prescribed range. The limitation cancelling section cancels the limitation of the output of the drive assistance motor upon the determining section determining the completion of the gear shift operation.

With this bicycle drive apparatus, the output of the drive assistance electric motor is limited based on the shift command and completion of the gear shifting operation is determined based on the measurement result of the variation value related to rotation of the crank. When the gear shifting operation is completed, the limitation of the output of the drive assistance electric motor is cancelled. As a result, it is not necessary to provide a shift position sensor to confirm the shift position and the structure is simplified.

In accordance with a second aspect, the bicycle drive apparatus according to the first aspect further comprises a storage section that stores the variation value. The determining section sets the prescribed range based on a variation value stored before issuance of the shift command by the shift command section. With this bicycle drive apparatus, completion of the gear shilling operation can be determined based on a change of the variation value occurring between before and after the shift command.

In accordance with a third aspect, the bicycle drive apparatus according to the first aspect or the second aspect is provided such that the crank variation determining section determines the variation value based on a detected rotational speed of the bicycle crankset. With this bicycle drive apparatus, completion of the gear shifting operation can be determined by merely measuring the rotational speed of the crank and completion of the gear shifting operation can be determine without being affected by the type of transmission.

In accordance with a fourth aspect, the bicycle drive apparatus according to the first aspect or the second aspect is provided such that the crank variation determining section determines the variation value based on a detected magnitude of a pedaling force acting on the bicycle crankset. With this bicycle drive apparatus, completion of the gear shifting operation can be determined by merely measuring the magnitude of a pedaling force. In a bicycle having a drive assistance electric motor, it is generally common to measure the magnitude of the pedaling force. Thus, with this aspect, completion of the gear shifting operation can be determined without providing another sensor and a lower cost can be achieved.

In accordance with a fifth aspect, the bicycle drive apparatus according to the fourth aspect is provided such that the pedaling force acting on the crank is expressed as a rotational torque acting on a crank axle of the bicycle crankset. With this bicycle drive apparatus, completion of the gear shifting operation can be determined without regard for the type of transmission by measuring the rotational torque acting on the crank axle.

In accordance with a sixth aspect, the bicycle drive apparatus according to the second aspect further comprises a traveling speed measuring section that measures a traveling speed of the bicycle. The crank variation determining section determines the variation value based on a detected rotational speed of the crankset. The storage section stores the rotational speed and the traveling speed. The determining section sets the prescribed range used by the determining section based on a traveling speed and a rotational speed measured before the shift command section issued the shift command and based on a current traveling speed. With this bicycle drive apparatus, since completion of the gear shifting operation is determined based on traveling speeds and crank axle rotational speeds measured before and after the shift command was issued, the completion of the gear shifting operation can be determined reliably even when the traveling speed has changed greatly between before and after the shift command due to sudden braking or the like.

In accordance with a seventh aspect, the bicycle drive apparatus according to any one of the first to sixth aspects is provided such that the transmission is an internal transmission. The internal transmission is a transmission that uses gear wheels. Depending on the position where the internal transmission is installed, it may be called a rear wheel hub transmission or a crank axle transmission. With this internal transmission, since gear shifting operations are generally smoother when the transmitted torque is smaller than when the transmitted torque is larger, it is preferable to limit the output of the drive assistance electric motor during a gear shifting operation and to cancel the limitation of the output after the gear shifting operation has been completed. With this bicycle drive apparatus, completion of a gear shifting operation in a bicycle equipped with a drive assistance electric motor and an internal transmission can be confirmed with a simple structure and limitation of the drive assistance electric motor output and cancellation of the limitation can be accomplished in an appropriate manner.

In accordance with an eighth aspect, the bicycle drive apparatus according to any one of the first to sixth aspects is provided such that the transmission is an external transmission. An external transmission is a transmission in which gear shifting is accomplished by moving the chain between sprockets using a derailleur. A front derailleur that moves the chain between sprockets of the crank axle and/or a rear derailleur that moves the chain between sprockets of the rear wheel are operated with a wire (cable) extending from a shifter or an electric motor in order to change gears. With this external transmission, a gear shifting operation is not adversely affected when some degree of tension exists in the chain, but gear shifting is difficult when an excessive amount of tension exists in the chain. Therefore, it is preferable to limit the output of the drive assistance electric motor during a gear shifting operation and cancel the limitation of the output after the gear shift has been completed. With this bicycle drive apparatus, completion of a gear shifting operation in a bicycle equipped with a drive assistance electric motor and an external transmission can be confirmed with a simple structure and limitation of the drive assistance electric motor output and cancellation of the limitation can be accomplished in an appropriate manner.

In accordance with a ninth aspect, the bicycle drive apparatus according to any one of the first to eighth aspects is provided such that the drive assistance electric motor is configured to drive a bicycle chain. With this bicycle drive apparatus, the chain that transmits a pedaling force of a person to the crank is driven directly or indirectly by the drive assistance electric motor. Therefore, it is preferable to limit the output of the drive assistance electric motor during a gear shifting operation and cancel the limitation of the output quickly after the gear shift has been completed. With this aspect of the invention, completion of a gear shifting operation in a bicycle equipped with a drive assistance electric motor that drives the chain can be confirmed with a simple structure and limitation of the drive assistance electric motor output and cancellation of the limitation can be accomplished in an appropriate manner.

With the bicycle drive apparatus, as described in more detail below, the output of the drive assistance electric motor is limited based on the shift command and completion of the gear shifting operation is determined based on the measurement result of a variation value related to rotation of the crank. When the gear shifting operation is completed, the limitation of the output of the drive assistance electric motor is cancelled. As a result, a shift position sensor for checking the shift position is not necessary, the structure is simplified, and the weight and cost can be reduced. The present invention can be employed in various types of electrically assisted bicycle having a transmission.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
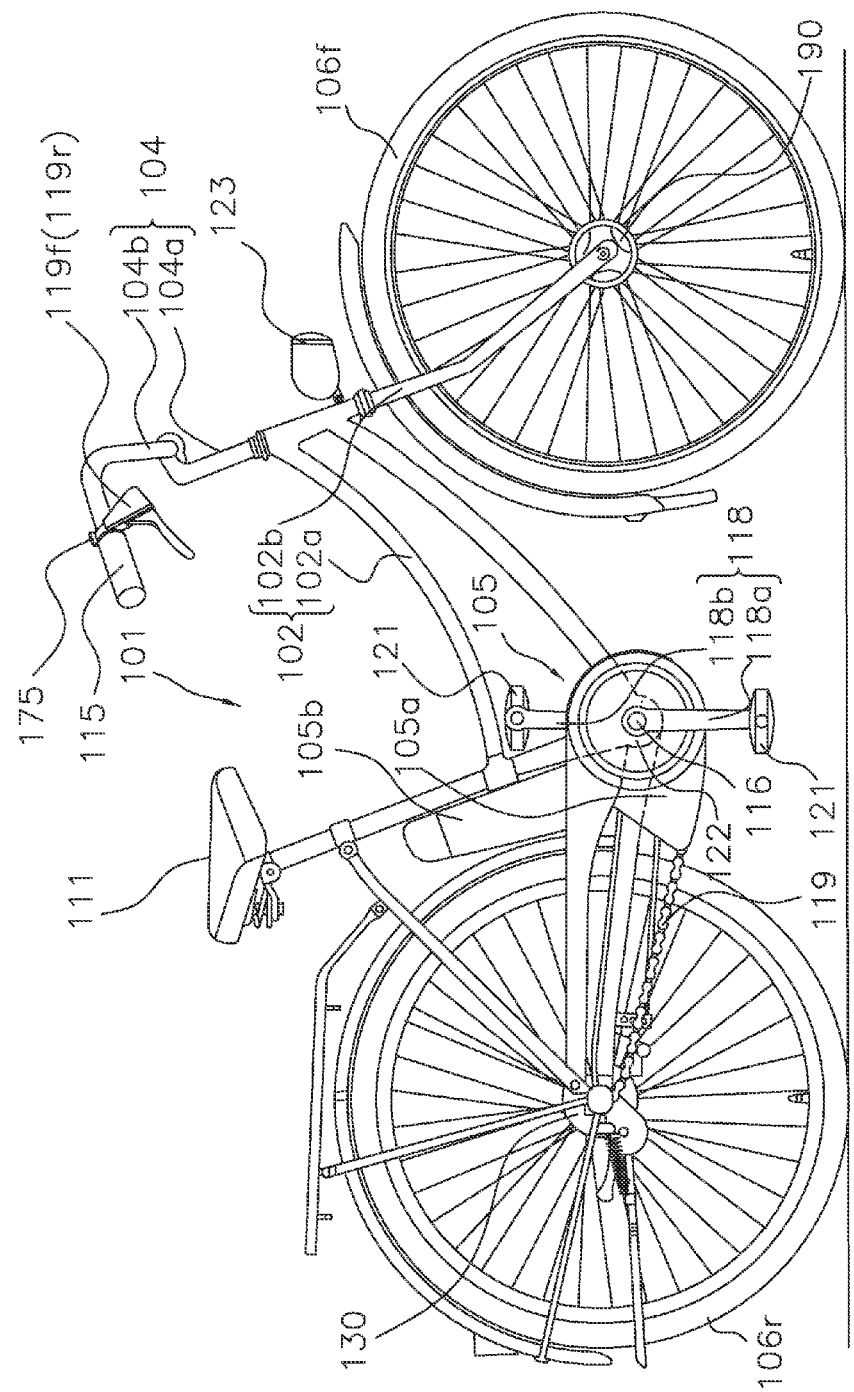
FIG. 1 is a side elevational view of a bicycle in which a bicycle drive apparatus is employed in accordance with a first embodiment.

FIG. 1 shows a bicycle 101 that employs a first embodiment of the present invention. The bicycle 101 is an assisted bicycle contrived to assist a rider by using an assist mechanism 105a to supplement a drive force imparted by the rider. The bicycle 101 comprises a frame 102 having a frame body 102a and a front fork 102b, a handlebar unit 104, a drive unit 105, a front wheel 106f, a rear wheel 106r, a front brake device and a rear brake device shown in the figure, and a headlamp 123. The bicycle 101 also has the electrical system 150 shown in FIG. 2, which comprises a plurality of electrical components for the bicycle. Electrical components provided are a control unit 151, the assist mechanism 105a, a rechargeable battery 105b, a hanger unit 122a, a gear shifting unit 170, the headlamp 123, a gear shifter 175, and a dynamo hub 190.

In the explanations that follow, positional relationships are explained using the words "left" and "right." The words "left" and "right" refer to the left and right directions of the bicycle 101 as viewed from the rear.

As shown in FIG. 1, the front fork 102b is attached to a frontward portion of the frame body 102a such that it can pivot about a slanted axis. The headlamp 123 is an energy conserving type that uses an LED and is provided on a frontward face of the front fork 102b. A saddle 111, the handlebar unit 104, and other components are attached to frame body 102a. A hanger tube 122 is provided on a bottom middle portion of the frame body 2a for supporting a crank axle 116 (explained later).

A hanger unit 122a has a torque sensor 141 and a crank rotational speed sensor 142. The hanger unit 122a is provided in the hanger tube 122. The torque sensor 141 measures a rotary torque acting on the crank axle 116 (explained later) to be used as a pedaling force. The torque sensor 141 measures a torque of the crank axle 116 either in a non-contact manner or by contacting the crank axle 116 or the crank arms 118 fixed to both ends of the crank axle 116. The torque sensor 141 is, for example, a magnetorestrictive sensor having a magnetorestrictive element provided on the crank axle 116 and a detection coil arranged facing opposite the magnetorestrictive element, a strain gauge provided on the crank axle 116 or the crank arms 118, or a strain gauge provided on the hanger tube 122 supporting the crank axle 116. The torque sensor 141 is not limited to these configurations and any sensor whose output varies according to the torque acting on the crank axle 116 is acceptable. The rotational speed sensor 142 serves to detect a number of rotations per unit time, i.e., a rotational speed, of the crank axle 116. The rotational speed sensor 142 is an example of a crank variation determining section or sensor that measures a variation value related to rotation of the crank. The rotational speed sensor 142 includes, for example, a magnet and a magnet detecting section comprising a reed switch or a Hall element. The magnet of the rotational speed sensor 142 is attached to the crank and the magnet detecting section is attached to the frame at a position where it can face across from the magnet.

The handlebar unit 104 has a handlebar stem 104a that is fastened atop the front fork 102b and a handlebar 104b that is fastened to the handlebar stem 104a. The handlebar 104b has a right brake lever 119f and left brake lever 119r and grips 115 arranged on both ends. The gear shifter 175 for operating the gear shifting unit 170 (explained later) with one's hand is attached to a portion of the handlebar 104b closer to the rider than a portion where the right brake lever 119f is attached.

The right brake lever 119f is connected to a front brake device by a front brake cable (not shown). The left brake lever 119r is connected to a rear brake device by a rear brake cable (not shown).

Figure 2:
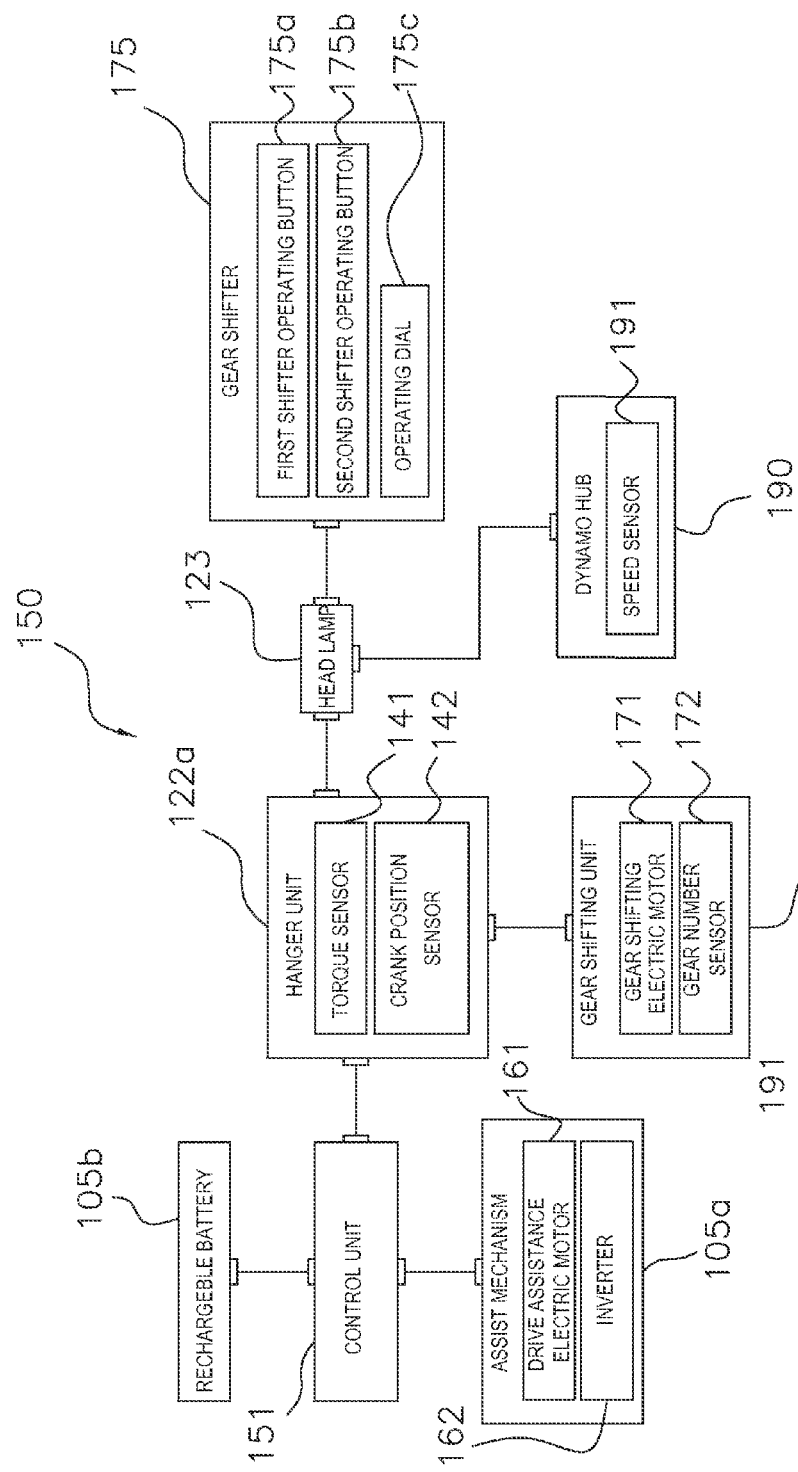
FIG. 2 a block diagram showing constituent features of a bicycle electrical system of the bicycle in which the first embodiment is employed.
Figure 3:
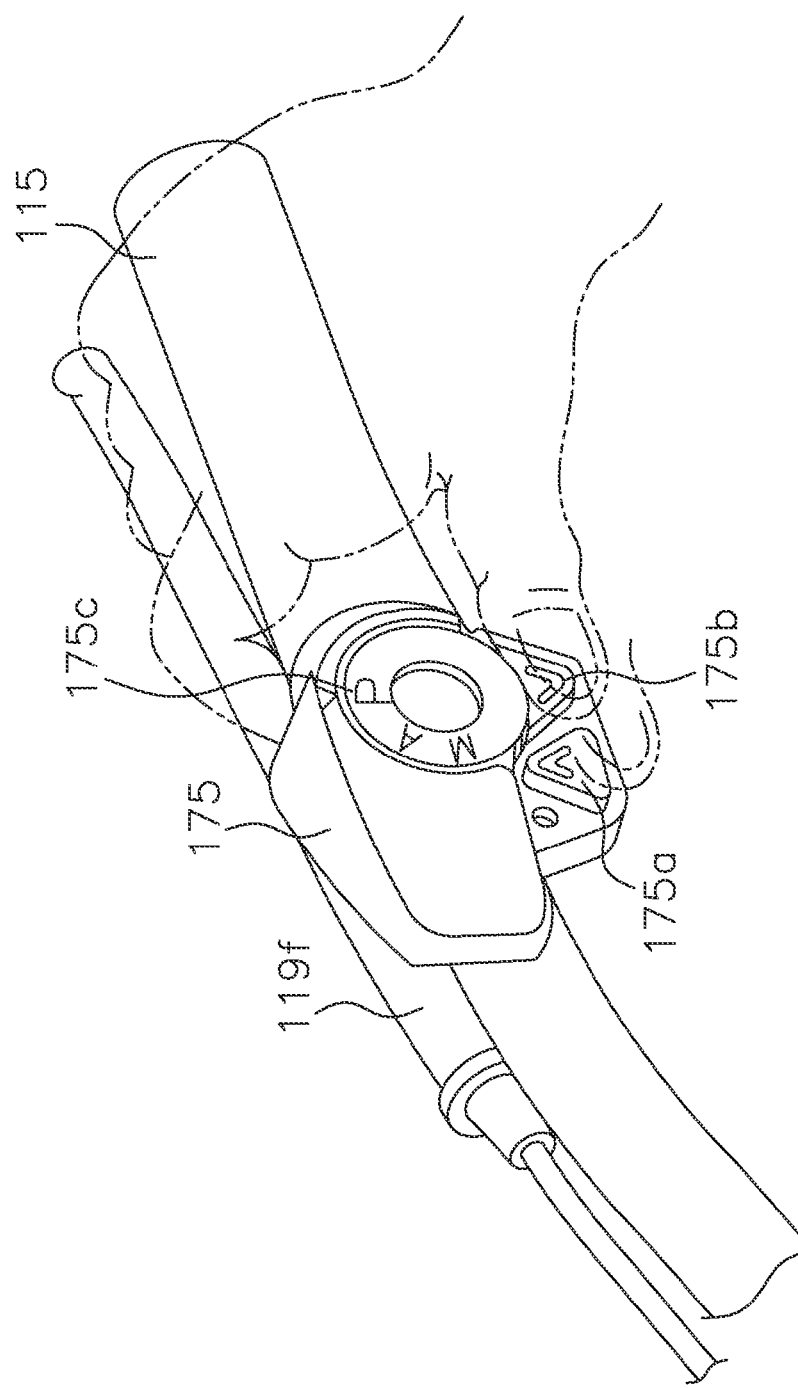
FIG. 3 is a perspective view of a handlebar unit of a bicycle in which a first embodiment is employed.

As shown in FIG. 2 and FIG. 3, the gear shifter 175 has a first shifter operating button 175a, a second shifter operating button 175b, and an operating dial 175c. As shown in FIG. 3, the first and second shifter operating buttons 175a and 175b and the operating dial 175c are positioned such that a person can operate them with a finger while gripping the grips 115 of the handlebar 104b.

The first and second shifter operating buttons 175a and 175b are pushbuttons. The first shifter operating button 175a is a button for shifting from a lower gear to a higher gear. The second shifter operating button 175b is a button for shifting from a higher gear to a lower gear. The operating dial 175c is a dial for switching between two shift modes and a parking (P) mode and has three stop positions: P, A and M. The two shift modes are an automatic shifting mode (A) and a manual shifting mode (M). The automatic shifting mode is a mode in which an internally geared hub 130 is shifted automatically based on a bicycle speed signal from a speed sensor 191 (explained later). The manual shifting mode is a mode in which the internally geared hub 130 is shifted to any desired gear by operating the shifter operating buttons 175a and 175b. The parking mode is a mode in which the internally geared hub 130 is locked such that rotation of the rear wheel 106r is restricted; the parking mode is not used when the bicycle is ridden.

The drive unit 105 comprises the crank axle 116 rotatably supported in the hanger tube 122 of the frame body 102a. The drive unit 105 further comprises a right crank arm 118a, a left crank arm 118b, a chain 119, an assist mechanism 105a that assists with propelling the bicycle by driving the chain 119. The drive unit 105 further comprises a rechargeable battery 105b that is detachable, and an internally geared hub 130. The right crank arm 118a and the left crank arm 118b are fixed to opposite ends of the crank axle 116. The crank axle 116, the right crank arm 118a and the left crank arm 118b form a crankset. Pedals 121 are attached to tip ends of the right crank arm 118a and the left crank arm 118b. The right crank arm 118a and the left crank arm 118b are 180 degrees out of phase. The chain 119 is arranged on a front sprocket fixed to the crank axle 116 and a rear sprocket provided on the internally geared hub 130.

As shown in FIG. 2, the assist mechanism 105a has a drive assistance electric motor 161 and an inverter 162. The drive assistance electric motor 161 is, for example, a three-phase brushless DC motor or an AC motor. The inverter 162 converts a direct current outputted from the rechargeable battery 105b into an alternating current suitable for driving the drive assistance electric motor 161. In addition to serving as an electric power source for the assist mechanism 105a, the rechargeable battery 105b is also used as an electric power source for, for example, the headlamp 123 and the gear shifting unit 170 (explained later). The rechargeable battery 105b is, for example a nickel hydrogen battery or a lithium ion battery. The drive assistance electric motor 161 can drive the chain direction or indirectly. For example, it is acceptable for the drive assistance electric motor 161 to drive the chain through a reduction gear mechanism or to drive the crank through a reduction gear mechanism.

The internally geared hub 130 is arranged in a center portion of the rear wheel 106r and is driven by the chain 119. The internally geared hub is an example of a transmission. The internally geared hub 130 has, for example, eight speeds. A rear brake device comprising, for example, a roller brake, a band brake, or a disk brake is connected to the internally geared hub 130. The gear shifting unit 170 is connected to the internally geared hub 130 and serves to electrically drive a gear shifting mechanism that comprises a planetary gear mechanism. As shown in FIG. 2, the gear shifting unit 170 has a gear shifting electric motor 171 for driving the gear shifting mechanism of the internally geared hub 130.

The dynamo hub 190 is an alternating current generator provided in a center portion of the front wheel 106f. The dynamo hub 190 is connected to a front brake device comprising, for example, a roller brake, a band brake, or a disk brake. If a roller brake, a band brake, a disk brake or other type of front brake is not connected to the dynamo hub 190, then a V-brake, a cantilever brake or other brake device should be provided on the front fork 102b. The speed sensor 191 is provided in the dynamo hub 190 and serves to measure a bicycle speed of the bicycle. It is acceptable to provide a speed sensor 191 that is separate from the dynamo hub 190 in the dynamo hub 190 or to use the dynamo hub 190 itself as the bicycle speed sensor 191. When the speed sensor 191 is provided as a separate entity from the dynamo hub 190, the speed sensor 191 might comprise, for example, a magnet attached to a rotating portion of the dynamo hub 190 and reed switch or a Hall element attached to a non-rotating portion of the dynamo hub 190. When the dynamo hub 190 itself is used as the speed sensor 191, a traveling speed of the bicycle is calculated based on an alternating current waveform outputted from the dynamo of the dynamo hub 190. The speed sensor 191 is an example of a traveling speed measuring section. Although in this embodiment the speed sensor 191 is provided in the dynamo huh 190, it is acceptable to use a speed sensor comprising, for example, a magnet attached to a spoke and a reed switch or a Hall element attached to the frame.

Figure 4:
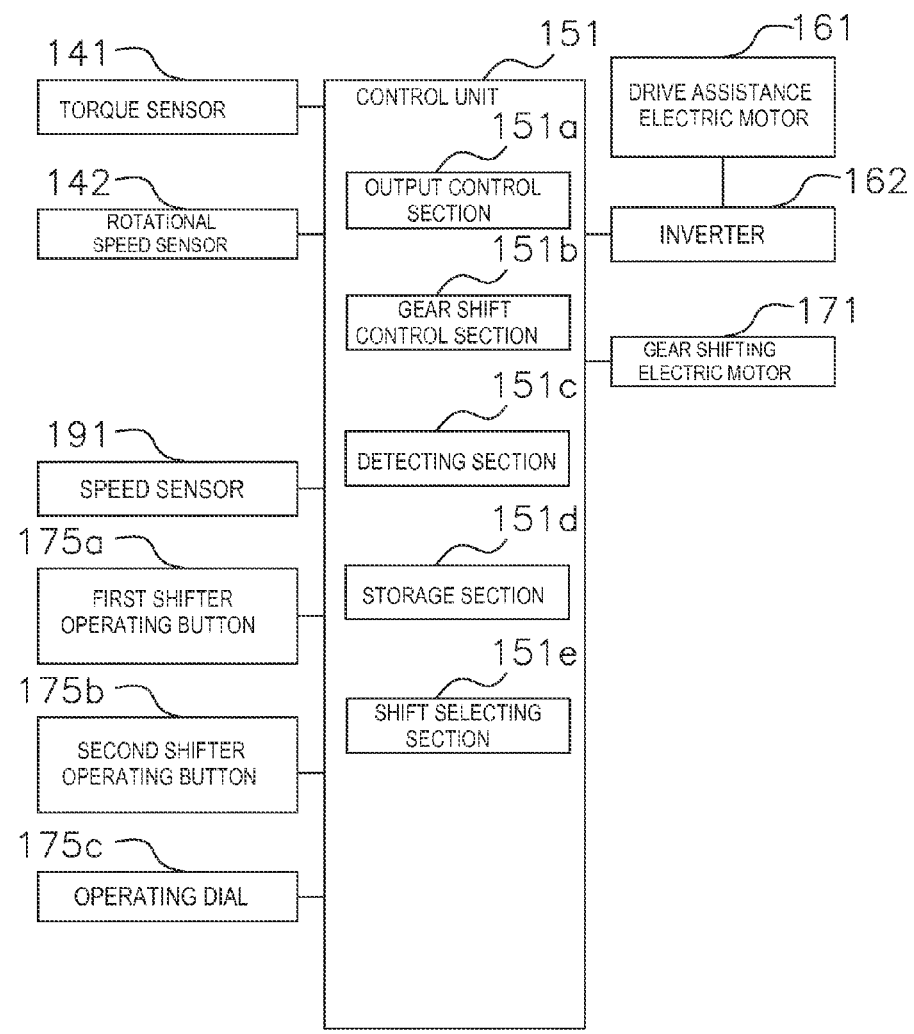
FIG. 4 is a block diagram of a bicycle control apparatus according to the first embodiment.

The control unit 151 of the bicycle control apparatus used with the bicycle 101 will now be explained. The control unit 151 has a microcomputer and serves to control electric components that are connected to the control unit 151. The microcomputer includes a CPU (central processing unit), a RAM (random access memory), a ROM (read only memory), and an I/O interface. As shown in FIG. 4, the control unit 151 has the following functional sections: an output control section 151a, a gear shift control unit 151b, a determining section 151c, a storage section 151d, and a shift selecting section 151e.

During an assist mode, the output control section 151a varies the output of the drive assistance electric motor 161, which serves as an assisting force, in accordance with a pedaling force. More specifically, the output control section 151a executes a control such that the output of the drive assistance electric motor 161 becomes equal to a product of a prescribed value and the pedaling force detected by the torque sensor 141. The output control section 151a controls the drive assistance electric motor 161 in a plurality of assist modes. The output control section 151a has three assist modes, namely a high assist mode that assists with an assist force up to a maximum of 2 times the pedaling force, a medium assist mode that assists with an assist force up to a maximum of 1.5 times the pedaling force, and a low assist mode that assists with an assist force up to a maximum of 1 times the pedaling force. It is acceptable for the assist modes to be changed using a switch (not shown) provided on the handlebar unit 104 or using the operating dial 175c.

Figure 5:
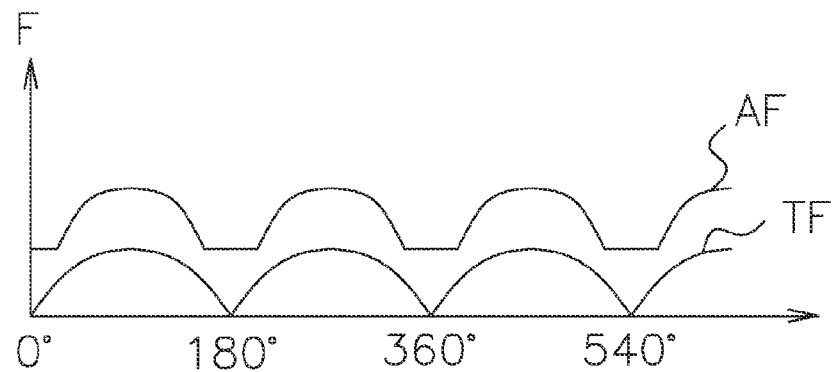
FIG. 5 is an example of how the output of the drive assistance electric motor changes during an assist mode of a bicycle in which the first embodiment is employed.

However, if the output (AF) of the drive assistance electric motor is set to the product of the pedaling force (TF) detected by the torque sensor 141 and a prescribed value, then the output of the drive assistance electric motor 161 will decrease to approximately zero when the crank arms are near top and bottom dead center positions where the pedaling force decreases nearly to zero. As a result, the output of the drive assistance electric motor 161 will pulsate repeatedly on and off and adversely affect the comfort of the rider. Therefore, in each of the assist modes, a control is executed to avoid the pulsation. More specifically, if the value obtained by multiplying the pedaling force detected by the torque sensor 141 by a prescribed value is smaller than another prescribed value, then the output of the drive assistance electric motor 161 is set to the other prescribed value and supplied to the chain 19. That is, the output of the drive assistance electric motor 161 follows the trend shown in FIG. 5. In the graphs shown in FIG. 5, the horizontal axis indicates the crank position and the vertical axis indicates the pedaling force and the output of the drive assistance electric motor.

In certain cases, the output control section 151a limits the output of the drive assistance electric motor to 161 to zero. Additionally, if a cancellation condition is established for the prescribed limitation, then the output limitation of the drive assistance electric motor 161 can be cancelled and control executed according to the pedaling force can be resumed. The output control section 151a is an example of a limiting section and a limitation cancelling section.

The gear shift control unit 151b instructs the gear shifting electric motor 171 to operate at a prescribed timing explained later. The gear shift control unit 151b is an example of a shift command section.

The determining section 151c determines if a gear shifting operation has been completed based on a rotational speed of a crank axle 116 measured by the rotational speed sensor 142. The functions of the determining section 151c will be explained later.

The storage section 151d stores a rotational speed of the crank axle 116 that is measured by the rotational speed sensor 142 and a bicycle speed that is measured by the speed sensor 191. The storage section 151d also stores a gear to which the gear shift control unit 151b will command the transmission to change. The storage section 151d also stores information related to the gear ratio of the internally geared hub 130.

The shift selecting section 151e recognizes the shift mode set by the operating dial 175c and executes a control corresponding to the recognized mode.

If the recognized mode is the automatic shifting mode (A), then the shift selecting section 151d selects a gear to be changed to according to the bicycle speed measured by the speed sensor 191 and transmits a gear shift request requesting the gear shift control unit 151b to change to the selected gear. The selection of the gear to be changed to is accomplished based on a table that stores a mapped relationship between bicycle speed and gear. Basically, the shift selecting section 151e holds two different tables for automatic shifting and uses one table or the other depending on the pedaling force detected by the torque sensor 141. More specifically, a table for a high torque mode and a table for a normal mode are stored and both tables store bicycle speed threshold values for upshifting and downshifting in the automatic shifting mode. The bicycle speed threshold values stored tier the high torque mode are bicycle speed threshold values for when the pedaling force value is equal to or larger than a prescribed value, and the bicycle speed threshold values stored for the normal mode are bicycle speed threshold values for when the pedaling force value is smaller than a prescribed value.

Meanwhile, if the shift selecting section 151e recognizes that the operating dial 175c is set to manual mode (M), then the shift selecting section 151e will execute gear shifts according to the rider's operations of the gear shifter 175 regardless of determinations regarding shifting.

Figure 6:
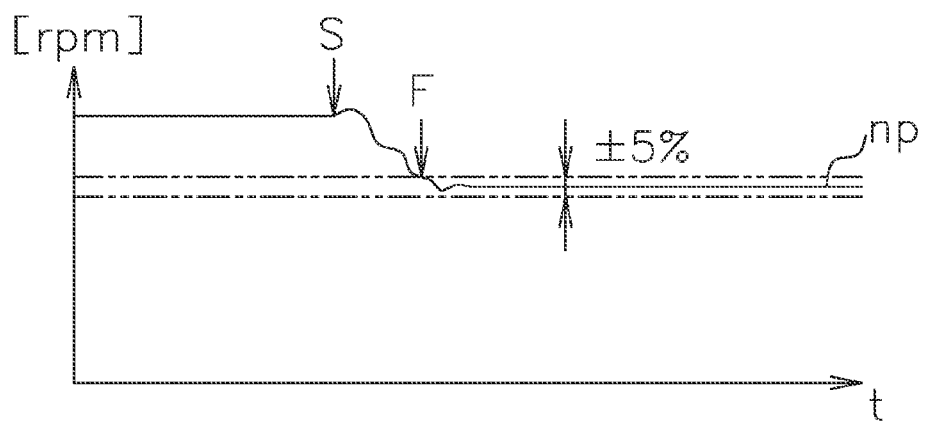
FIG. 6 exemplifies how completion of a gear shifting operation is determined using a crank axle rotational speed in a bicycle according to the first embodiment of the present invention when the bicycle is traveling at a substantially constant speed.

How the determining section 151c determines if a gear shifting operation has been completed will now be explained with reference to FIG. 6 and FIG. 7. FIG. 6 exemplifies how completion of a gear shilling operation is determined when the bicycle is traveling at a substantially constant speed. FIG. 7 exemplifies how completion of a gear shifting operation is determined when the bicycle speed changes greatly.

First FIG. 6 will be explained. In FIG. 6, the horizontal axis indicates time and the vertical axis indicates the rotational speed of the crank. In this case, the time from the start of a gear shifting operation until completion of the gear shifting operation is short because the traveling speed of the bicycle is assumed to be substantially constant.

The determining section 151c reads from the storage section 151d a rotational speed of the crank axle 116 that was detected immediately before the gear shift control unit 151b issued a shift command. If the operating dial 175c is set to the automatic shifting mode, then the determining section 151c calculates an anticipated rotational speed of the crank axle 116 expected after changing gears based on the rotational speed of the crank axle 116 read from the storage section 151d and the gear requested to be shifted to by the shift selecting section 151e. If the operating dial 175c is set to the manual shifting mode, then the determining section 151c calculates the anticipated rotational speed of the crank axle 116 expected after changing gears based on the rotational speed of the crank axle 116 read from the storage section 151d and the shift direction (from a lower gear to a higher gear or from a higher gear to a lower gear) selected by operating the first shifter operating button 175a or the second shifter operating button 175b. More specifically, information related to the gear ratios of the internally geared hub 130 are stored in the storage section 151d in advance and used to calculate the anticipated rotational speed of the crank axle 116.

Still more specifically, if, for example, the rotational speed of the crank is n1 (rpm) before the shift command is issued and the gear ratio of the gear being changed from with respect to the gear to be changed to is 1:R, then the anticipated rotational speed np expected after the gear shift is calculated as n1/R. (rpm). The gear ratio of an internal transmission is expressed as the ratio of the number of output rotations obtained from the internal transmission when an input section of the internal transmission is rotated once, and the gear ratio of an external transmission is expressed as the number of rear hub (rear wheel) rotations obtained when the crank is rotated once.

As shown in FIG. 6, the determining section 151c determines that the gear shifting operation has been completed when a current rotational speed of the crank axle 116 measured by the rotational speed sensor 142 is within a prescribed range, e.g., ±5%, of the calculated anticipated rotational speed np. In FIG. 6, S indicates the point in time when the shift command was issued and F indicates the point in time when the gear shifting operation is determined to be finished (completed). Although FIG. 6 shows an example of changing from a low gear (low gear ratio) to a high gear (high gear ratio), the process is the same when changing from a high gear to a tow gear. Thus, completion of the gear shifting operation can be determined with a simple structure.

It is even more preferable for the determining section 151c to use a current bicycle speed and a bicycle speed stored in the storage section before the shift command was issued to compute a revision of the rotational speed and to use the revised rotational speed to determine if the gear shifting operation has been completed. The reason is that when the bicycle speed changes, the rotational speed of the crank axle 116 changes even if a gear shifting operation does not occur.

Figure 7A:
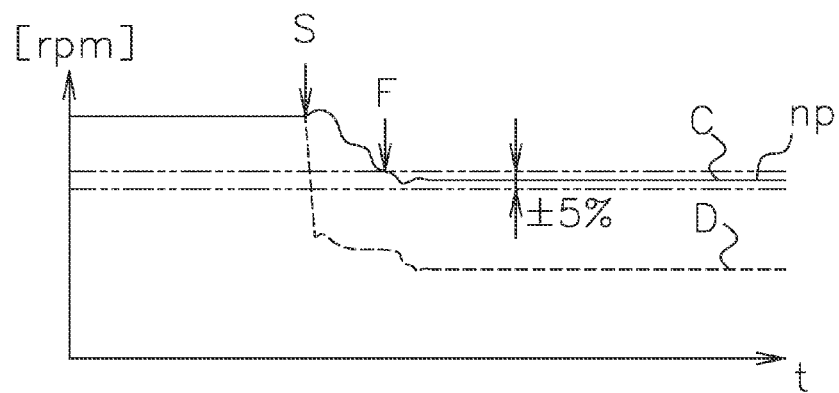
FIGS. 7A and 7B exemplify how completion of a gear shifting operation is determined using a crank axle rotational speed in a bicycle according to the first embodiment of the present invention when the bicycle speed changes greatly.
Figure 7B:
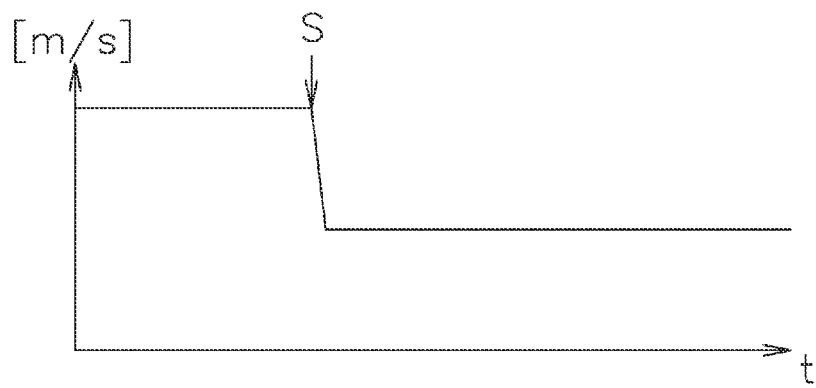

A specific example of a revision that could be executed will now be explained. Assume a bicycle speed v1 was detected before the shift command was issued, a current bicycle speed v2 is detected, and a current rotational speed n (rpm) is detected. In such a case, the revised rotational speed of the crank axle 116 is calculated as n×v1/v2 (rpm). The determining section 151c determines that the gear shifting operation has been completed when the revised rotational speed of the crank axle 116 given by n×v1/v2 (rpm) is within a prescribed range, e.g., ±5%, of the anticipated rotational speed np of the crank axle 116 based on the gear ratio. With this approach, the completion of the gear shifting operation can be determined easily as shown in FIG. 7A even if the bicycle speed changes greatly (due to sudden braking, for example) after the shift command is issued as shown in FIG. 7B. In FIGS. 7A and 7B, the term S indicates the point in time when the shift command was issued, and the term F indicates the point in time when the gear shifting operation is determined to be finished (completed). The solid-line curve C is the revised rotational speed, and the broken-line curve D is the rotational speed the rotational speed actually measured by the rotational speed sensor 142.

Figure 8:
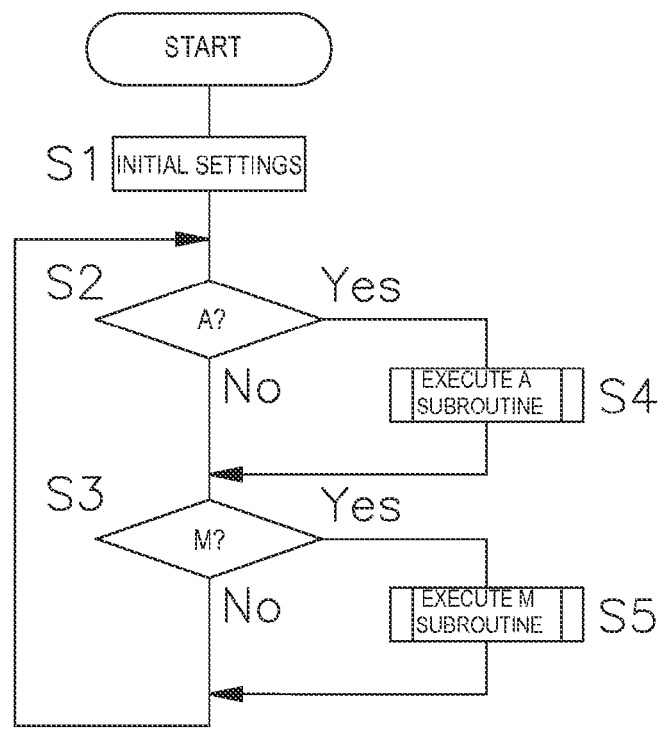
FIG. 8 is a flowchart showing an example of a main routine of a shift control.
Figure 9:
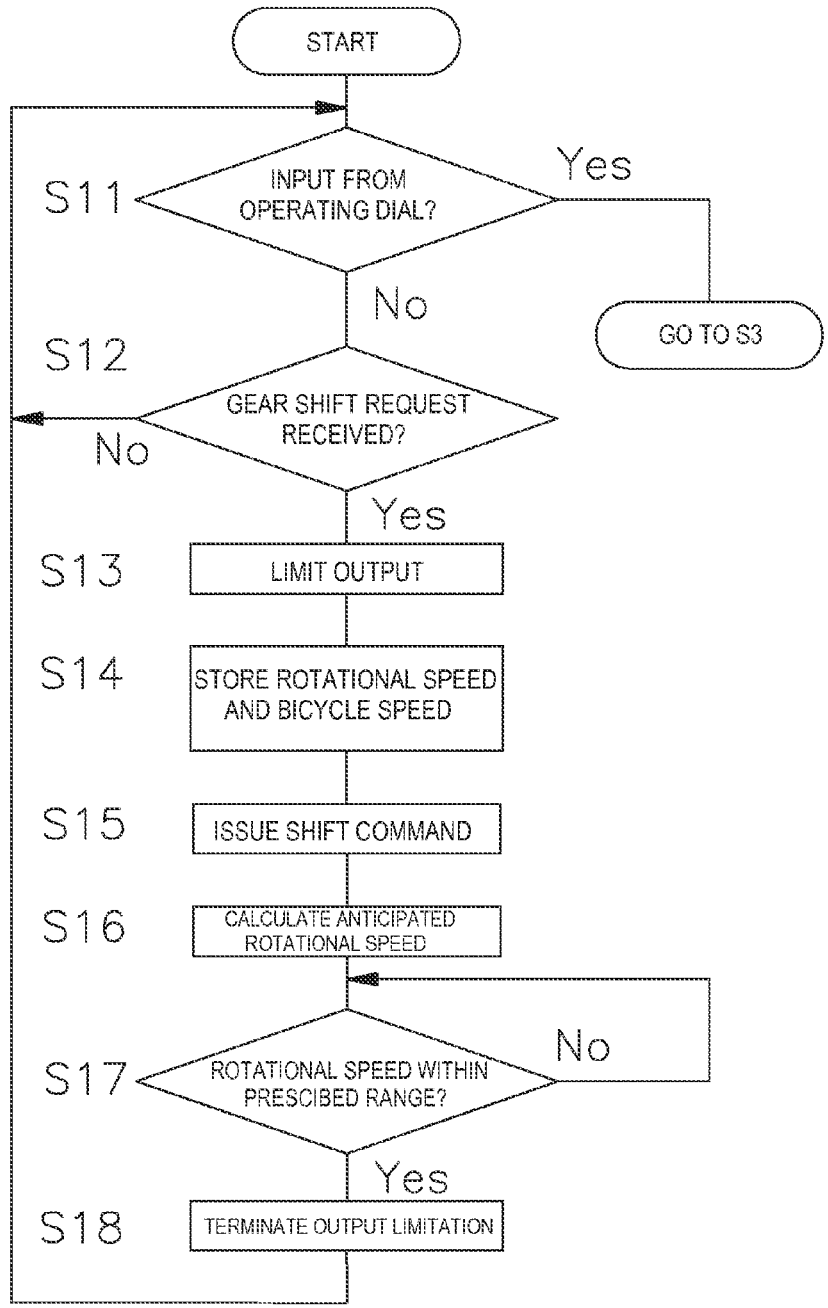
FIG. 9 is a flowchart showing an example of an automatic shifting subroutine.
Figure 10:
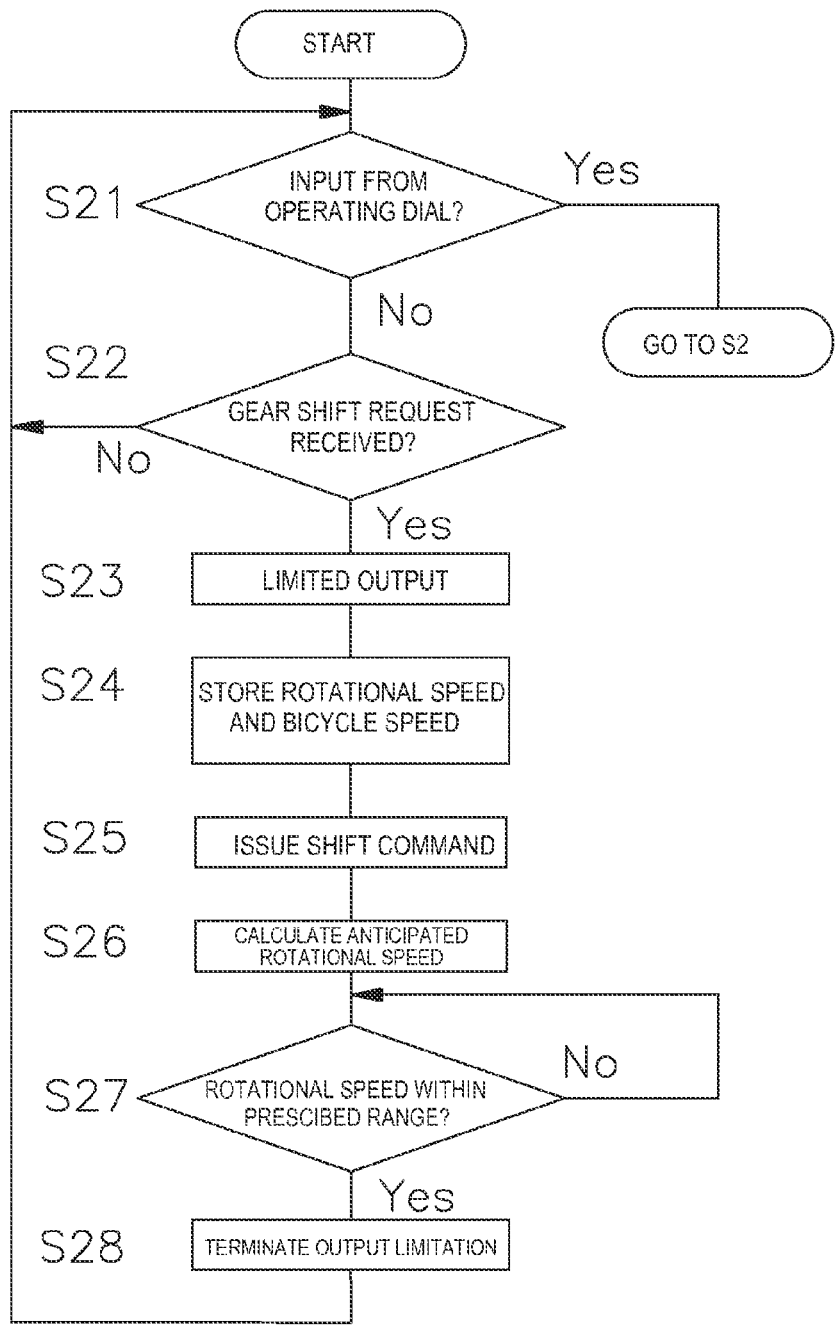
FIG. 10 is a flowchart showing an example of a manual shifting subroutine.

Control operations executed by the control unit 151 during assisted riding will now be explained based the examples presented in the flowcharts of FIGS. 8 to 10.

First, the example of a main routine of the shift control shown in the flowchart of FIG. 8 will be explained.

After the power is turned on, the control unit 151 executes initial settings in step S1. In step S2 the shift selecting section 151e determines if the operating dial 175c is set to the automatic shifting mode (A), and in step S3 the shift selecting section 151e determines if the operating dial 175c is set to the manual shifting mode (M). If the operating dial 175c is set to the automatic shifting mode, then the control unit 151 proceeds from step S2 to step S4. In step S4, the control unit 151 executes an automatic shifting subroutine explained later. If the operating dial 175c is set to the manual shifting mode, then the control unit 151 proceeds from step S3 to step S5. In step S5, the control unit 151 executes a manual shifting subroutine explained later.

The automatic shifting subroutine will now be explained based on FIG. 9. FIG. 9 is an example of a flowchart for the automatic shifting subroutine.

In step S11, the shift selecting section 151e determines if the operating dial 175c has been operated. If the operating dial 175c has been operated, then the control unit 151 returns to the main routine shown in FIG. 8 and proceeds to step S3 If the operating dial 175c has not been operated, then the control unit 151 proceeds to step S12.

In step S12, the shift selecting section 151e selects a gear as explained previously based on the vehicle speed measured by the speed sensor 191. If the selected gear and the current gear are different, then the shift selecting section 151e transmits a gear shift request to the gear shift control unit 151b requesting to change to the selected gear. If the gear shift control unit 151b receives a gear shift request from the shift selecting section 151e, then the control unit 151 proceeds to step S13. If a signal is not received, then the control unit 151 returns to step S11.

In step S13, the output control section 151a limits the output of the drive assistance electric motor 161. In thus embodiment, the output of the drive assistance electric motor 161 is set to zero.

In step S14, the storage section 151d stores the current rotational speed of the crank axle 116 detected by the rotational speed sensor 142 and the current bicycle speed detected by the speed sensor 191 as information indicating the state existing before the shift command was issued.

In step S15, the gear shift control unit 151b commands the transmission to change gears. More specifically, the gear shift control unit 151b instructs the gear shifting electric motor 171 to start operating such that the internally geared hub 130 changes to the gear requested by the shift selecting section 151e.

In step S15, the determining section 151c calculates an anticipated rotational speed of the crank axle 116 expected after the gear shift based on the rotational speed stored in step S14, the information stored in the storage section 151d related to the gear in effect before the gear shift and the gear ratios of the internally geared hub 130, and the gear requested by the shift selecting section.

In step S17, the determining section 151c determines if the current rotational speed of the crank axle 116 detected by the rotational speed sensor 142 is within a prescribed range with respect to the anticipated rotational speed calculated in step S16. In this step, it is also acceptable to use the traveling speed of the bicycle stored in step S14 and the current traveling speed of the bicycle to revise the rotational speed of the crank axle 116 and compare the revised rotational speed to the anticipated rotational speed. If the rotational speed of the crank axle 116 (or the revised rotational speed of the crank axle 116) is within a prescribed range with respect to the anticipated rotational speed, then the determining section 151c determines that the gear shifting operation has been completed and proceeds to step S18.

In step S18, the output control section 151a issues a command to cancel the limitation of the output of the drive assistance electric motor 161. At the same time, the gear resulting after the gear shifting operation is stored in the storage section 151d. The control unit 151 then returns to step S11.

A manual shifting subroutine will now be explained based on FIG. 10. FIG. 10 is a flowchart, showing an example of an automatic shifting subroutine.

In step S21, the shift selecting section 151e determines if the operating dial 175c has been operated. If the operating dial 175c has been operated, then the control unit 151 returns to the main routine and proceeds to step S2. If the operating dial 175c has not been operated, then the control unit 151 proceeds to step S22.

In the step S22, the control unit 151 determines if the first shifter operating button 175a or the second shifter operating button 175b of the gear shifter 175 has received a shift request. If it determines that a signal has been received, then the control unit 151 proceeds to step S23. If a signal has not been received, then the control unit 151 returns to step S21.

In step S23, the output control section 151a limits the output of the drive assistance electric motor 161. With this embodiment, the output of the drive assistance electric motor 161 is set to zero.

In step S24, the storage section 151d stores the current rotational speed of the crank axle 116 detected by the rotational speed sensor 142 and the current traveling speed of the bicycle detected by the speed sensor 191 as information indicating the state existing before the shift command was issued.

In step S25, the gear shift control unit 151b issues a command to change gears to the transmission. More specifically, the gear shift control unit 151b commands the gear shifting electric motor 171 to operate such that the internally geared hub 130 is shifted in the shift direction indicated by the gear shifter 175 (from a lower gear to a higher gear or from a higher gear to a lower gear).

In step S26, the determining section 151c calculates an anticipated rotational speed of the crank axle 116 expected after the gear shift based on the rotational speed stored in step S24, the direction of the gear shift indicated by the gear shifter 175, and the information stored in the storage section 151d related to the gear in effect before the gear shift and the gear ratios of the internally geared hub 130.

In step S27, the determining section 151c determines if the current rotational speed of the crank axle 116 detected by the rotational speed sensor 142 is within a prescribed range with respect to the anticipated rotational speed calculated in step S26. In this step, it is also acceptable to use the traveling speed of the bicycle stored in step S24 and the current traveling speed of the bicycle to revise the rotational speed of the crank axle 116 and compare the revised rotational speed to the anticipated rotational speed if the rotational speed of the crank axle 116 (or the revised rotational speed of the crank axle 116) is within the prescribed range with respect to the anticipated rotational speed, then the determining section 151c determines that the gear shifting operation has been completed and proceeds to step S28.

In step S28, the output control section 151a issues a command to cancel the limitation of the output of the drive assistance electric motor 161. At the same time, the gear resulting after the gear shifting operation is stored in the storage section 151d. The control unit 151 then returns to step S21.

In the first embodiment, the determining section 151c determines that a gear shifting operation has been completed when a measurement value of the rotational speed sensor 142 is within a prescribed range. Meanwhile, in the second embodiment, the detecting section 251c determines if a gear shifting operation has been completed based on a variation value of the torque sensor 141. In the second embodiment, the torque sensor 141 exemplifies a crank variation determining section that measures a variation value related to rotation of the crank and a rotational speed sensor is not necessary. Otherwise, the constituent features are the same as in the first embodiment.

Figure 11:
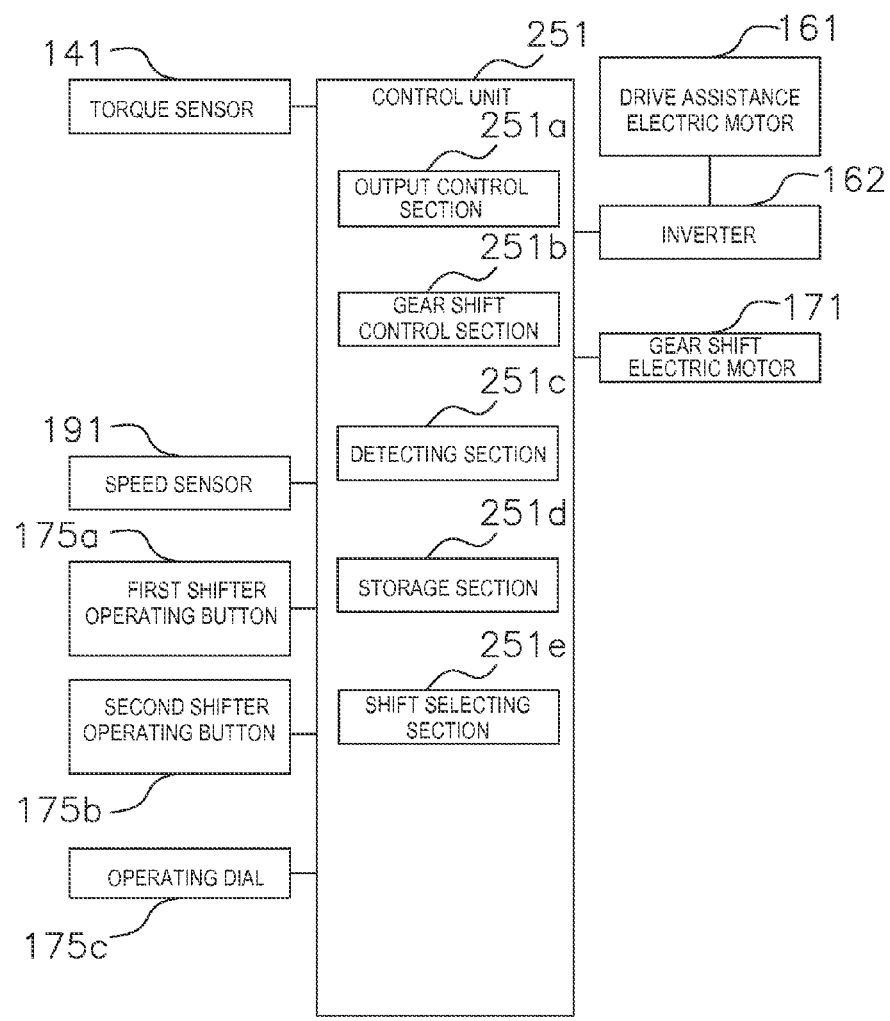
FIG. 11 is a block diagram of a bicycle control apparatus according to a second embodiment.

FIG. 11 is a block diagram of a bicycle control apparatus according to the second embodiment.

The control unit 251 has an output control section 251a, a gear shift control section 251b, a detecting section 251c, a storage section 251d, and a shift selecting section 251e. Since the sections 251a, 251b, and 251e are the same as in the first embodiment, only the detecting section 251c and the storage section 251d will now be explained.

The storage section 251d stores a pedaling force measured by the torque sensor 141. The storage section 251d also stores a gear to which the gear shift control section 251b will command the transmission to change. The storage section 251d also stores information related to the gear ratio of the internally geared hub 130.

How the detecting section 251c determines if a gear shifting operation has been completed will now be explained. In this explanation, it is assumed that the slope of the surface on which the bicycle is ridden does not change and the bicycle does not suddenly accelerate or decelerate during the short period spanning from when the gear shifting operation starts until the gear shifting operation ends.

Figure 12:
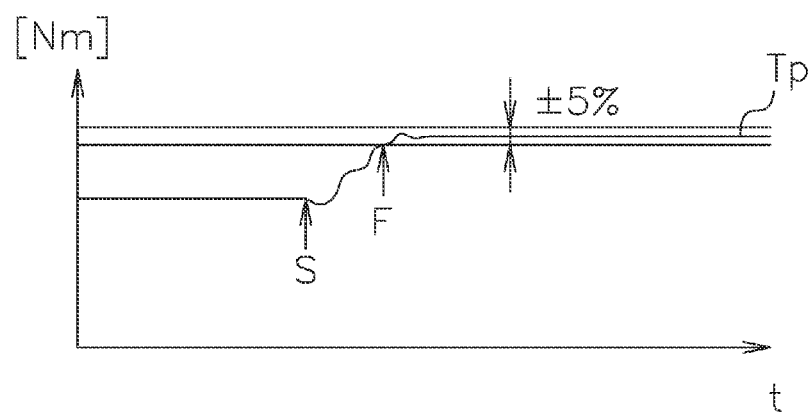
FIG. 12 exemplifies how completion of a gear shifting operation is determined using a pedaling force in a bicycle according to the second embodiment.

The detecting section 251c reads from the storage section 251d a pedaling force that was detected immediately before the gear shift control section 251b issued a shift command. When the operating dial 275c is set to the automatic shifting mode, the detecting section 251c calculates an anticipated pedaling three expected after the gear shift based on a pedaling force read from the storage section 251d and a gear selected by the shift selecting section 251e. When the operating dial 175c is set to the manual shifting mode, the detecting section 251c calculates an anticipated pedaling force expected after the gear shift based on a pedaling force read from the storage section 251d and the shift direction (from a lower gear to a higher gear or from a higher gear to a lower gear) selected by operating the first shifter operating button 175a or the second shifter operating button 175b. FIG. 12 shows an example of how the pedaling force changes during a change from a lower gear (lower gear ratio) to a higher gear (higher gear ratio). In FIG. 12, the horizontal axis indicates time and the vertical axis indicates the rotational speed of the crank. The detecting section 251c determines that the gear shifting operation has been completed when the pedaling force measured by the torque sensor 141 is within a prescribed range, i.e., ±5%, of the anticipated pedaling force (Tp). In FIG. 12, the symbol S indicates the point in time when the gear shifting operation started and the symbol F indicates the point in time when the gear shifting operation is determined to be finished (completed). With this embodiment, completion of a gear shifting operation can be determined easily without using a rotational speed sensor.

Also, with this configuration, if an acceleration sensor and/or a grade angle sensor is further provided, the gear shift completion determination can be execute such that the effects of acceleration or deceleration of the bicycle are taken into account.

Although embodiments of the present invention have been presented heretofore, the present invention is not limited to these embodiments and various modifications can be made without departing from the scope of the invention as defined by the claims.

In the previously explained embodiment, the assist mechanism 105a is arranged nearby the crank axle 116 and the output of the drive assistance electric motor 161 is transmitted to the chain 119. Instead of the assist mechanism 105a, it is acceptable to install a motor unit for riding assistance on the front wheel 106f. A drive assistance electric motor, an inverter, and a bicycle speed sensor are preferably arranged inside the motor unit.

In the previously explained embodiment, the assist mechanism 105a is arranged nearby the crank axle 116 and the output of the drive assistance electric motor 161 is transmitted to the chain 119. Instead of the assist mechanism 105a, it is acceptable to install a motor unit for riding assistance on the rear wheel 106r. In such a case, the motor unit is provided on an output side of the transmission.

In the previously explained embodiment, the present invention is employed in a bicycle 101 in which an internally geared hub 130 constituting an internal transmission is installed on the rear wheel 106r. Instead, it is acceptable for the invention to be employed in a bicycle having a transmission that is installed on the crank axle and configured to change gears using a planetary gear mechanism.

In the previously explained embodiment, the present invention is employed in a bicycle 101 in which an internally geared hub 130 constituting an internal transmission is installed on a rear wheel 106r. Instead, it is acceptable for the invention to be employed in a bicycle equipped with an external transmission having a front derailleur and/or a rear derailleur that are electrically driven.

In steps S13 and S23 of the previously explained embodiments, the output control section 151a sets the output of the drive assistance electric motor 161 to zero and temporarily stops the riding assistance while the gear shifting operation is in progress. Instead, it is acceptable to configure the steps S13 and S23 such that the riding assistance three is temporarily reduced during the gear shifting operation by decreasing the output of the drive assistance motor 161 to be smaller than an output value based on the assist mode in effect at that time (e.g., decrease the output to half the output value).

Although in the previously explained embodiment the bicycle has a transmission equipped with a gear shifting electric motor 171, it is not necessary to have a gear shifting electric motor and it is acceptable to use a transmission that is operated manually using a gear shift wire.

Although the output of a torque sensor 141 is used as the pedaling force in the previously explained embodiments, instead of the torque sensor 141, it is acceptable to provide a sensor that detects a depression force of a pedal or a sensor that detects a tension of the chain.

It is acceptable for an indicator/input device having a touch panel to be fastened to the handlebar unit 104 and such that it can be used for such things as selecting the assist mode, indicating the bicycle speed and gear position, and displaying the remaining capacity of the rechargeable battery 105b.

In the previously explained embodiments, a single anticipated variation amount is calculated using information indicating the gears in effect both before and after the shift command is issued. Instead, it is acceptable not to use information indicating the gear that will be in effect after the gear shift and, instead, calculate the anticipated value of the variation amount expected after the gear shift based on all of the gears that could potentially be changed to from the gear in effect before the gear shift. It is also acceptable not to use information indicating the gear that was in effect before the gear shift and, instead, calculate the anticipated value of the variation amount expected after the gear shift based on all of the gears that could potentially have been in effect before the gear shift. In either case, the gear shifting operation is determined to have been completed when the variation value has remained within a prescribed range with respect to the anticipated value for a prescribed amount of time.

Moreover, components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive apparatus comprising:
   a bicycle crankset;
   a bicycle transmission;
   a drive assistance electric motor;
   a crank variation determining sensor arranged to determine a variation value related to rotation of the bicycle crankset and
   a microcomputer including
      a shift command section that issues a shift command commanding the bicycle transmission to change gears,
      a limiting section that limits an output of the drive assistance electric motor upon issuance of the shift command,
      a determining section that determines completion of a gear shift operation upon the variation value being within a prescribed range, and
      a limitation cancelling section that cancels the limitation of the output of the drive assistance motor upon the determining section determining the completion of the gear shift operation.

2. The bicycle drive apparatus as recited in claim 1, further comprising
   a storage section that stores the variation value; and
   the determining section sets the prescribed range based on the variation value stored before issuance of the shift command by the shift command section.

3. The bicycle drive apparatus as recited in claim 1, wherein
   the crank variation determining section determines the variation value based on a detected rotational speed of the bicycle crankset 4. The bicycle drive apparatus as recited in claim 1, wherein
   the crank variation determining section determines the variation value based on a detected magnitude of a pedaling force acting on the bicycle crankset.

5. The bicycle drive apparatus as recited in claim 4, wherein
   the pedaling force acting on the crank is expressed as a rotational torque acting on a. crank axle of the bicycle crankset.

6. The bicycle drive apparatus as recited in claim 2, further comprising
   a traveling speed measuring section that measures a traveling speed of the bicycle;
   the crank variation determining section determining the variation value based on a detected rotational speed of the crankset;
   the storage section storing the rotational speed and the traveling speed; and
   the determining section setting the prescribed range based on the traveling speed and the rotational speed measured before the shift command section issued the shift command and based on a current traveling speed.

7. The bicycle drive apparatus as recited in claim 1, wherein the transmission is an internal transmission.

8. The bicycle drive apparatus as recited in claim 1, wherein the transmission is an external transmission.

9. The bicycle drive apparatus as recited in claim 1, wherein the drive assistance electric motor is configured to drive a bicycle chain.

* * * * *